Patented Nov. 27, 1928.

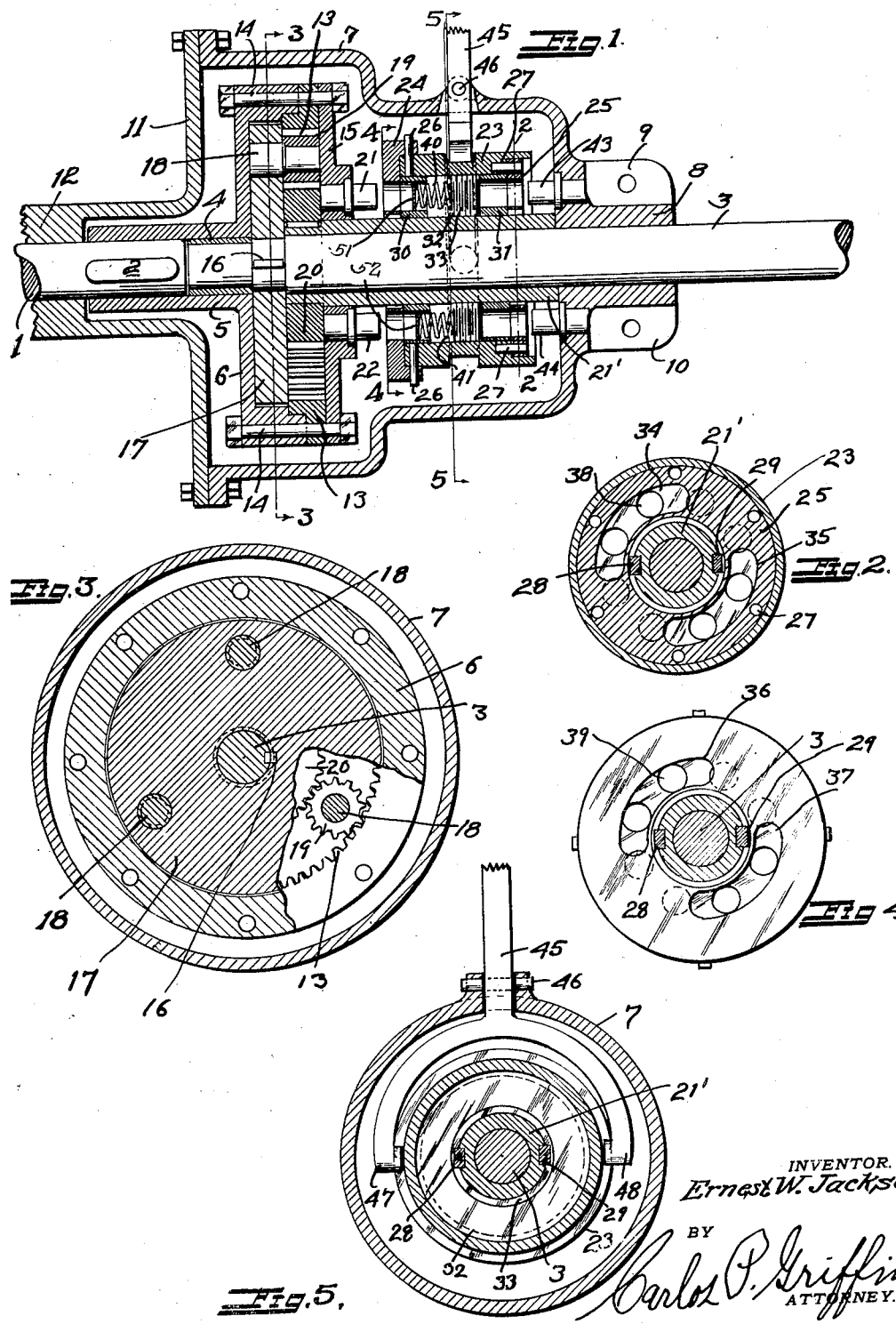

1,693,079

UNITED STATES PATENT OFFICE.

ERNEST W. JACKSON, OF SAN RAFAEL, CALIFORNIA, ASSIGNOR TO PERFECTO GEAR DIFFERENTIAL CO., OF OAKLAND, CALIFORNIA, A CORPORATION OF WASHINGTON.

SPEED-CHANGE TRANSMISSION GEARING.

Application filed October 25, 1921. Serial No. 510,384.

This invention relates to a speed change transmission gear and its object is to provide means whereby the speed change may be easily effected without undue shock upon the clutch members which effect the change in speed from one speed to the other.

The mechanism is of the planetary type and is intended to supplement the speeds of an ordinary two or three speed transmission with the reverse speed by producing an additional low or high speed dependent upon which end of this transmission the power shaft is applied to.

Another object of the invention is to produce an exceedingly small and compact unit which may be applied to any drive shaft with practically no mechanical change therein, other than the cutting of the shaft into two parts and supplying it with means to connect it to one of the parts of this transmission.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a vertical sectional view of the complete transmission and its enclosing casing.

Fig. 2 is a sectional view on the line 2—2 Figure 1.

Fig. 3 is a sectional view on the line 3—3 Figure 1.

Fig. 4 is a sectional view on the line 4—4 Figure 1, and

Fig. 5 is a sectional view on the line 5—5 Figure 1.

All of the figures being taken in the direction of the arrows.

The numeral 1 indicates the drive shaft which is provided with a key 2, and which is in alignment with the driven shaft 3 which has one end bearing in the bushing 4 in a hub 5 of the transmission enclosing casing 6. The entire transmission is in turn enclosed in a grease tight casing 7, which has a bearing at 8 with wings 9 and 10 for suitably securing the bearing in a rigid position in the apparatus in which the transmission is to be used.

At the other end of the casing 7 there is a detachable head 11 which has a bearing 12 for the shaft 1. The housing 6 is suitably turned to receive a ring gear 13, which is secured to the housing by means of bolts 14. These bolts also secure a plate 15 against said gear.

Rigidly secured on the shaft 3 by means of the key 16 is a disk 17. This disk has a plurality of studs 18 on each of which a planet gear 19 is journalled. The gears 19 of which three are used in the present instance, are in mesh with the ring gear 13 and with a center gear 20 secured to a sleeve 21' which is mounted on the shaft 3.

The plate 15 carries two fixed clutch studs 21, 22 which are for the purpose of locking the clutch rings to said plate 15 when required. The clutch rings consist of a housing 23, two rings 24, 25 secured to the housing 23 by means of pins 26, 27, and which latter rings pass over the two keys 28, 29 slidable in keyways formed in the sleeve 21', two rings 30, 31, and a plurality of clutch plates 32, 33.

The rings 24, 25 are provided with two elongated slots as indicated at 34, 35 Figure 2, and 36, 37 Figure 4. These two rings pass over the two keys 28, 29, and are permanently secured to the housing 23. The two rings 30, 31 have a plurality of circular holes 38, 39 as indicated in Figures 2 and 4.

The clutch plates 33 are slidably and non-rotatably connected to the enclosing housing 23, while the clutch plates 32 are slidably and non-rotatably connected with the sleeve 21'. Two springs 40, 41 cause the clutch plates 32, 33 to drag upon each other so that when the clutch members are slowed down by engagement of the ring 25 with the fixed pins 43, 44; or accelerated by the engagement of the ring 24 with the pins 21, 22, there will be at once a tendency to bring the rings 30, 31 to the same speed as the rings 24, 25, thereby making it possible to readily engage the pins 21, 22 or 43, 44 with the rings 30, 31, which as previously explained are slidably connected to the sleeve 21' by means of the keys 28, 29.

A lever 45 pivotally mounted on the casing 7 at 46, has two arms 47, 48 which engage the groove in the member 23 and serve to shift said member from one position to the other.

The operation of the apparatus above described is as follows: Assuming power to be applied to the shaft 1, the casing 6 will be rotated, and as long as the clutch members are in the position shown in Figure 1 there will be no tendency to drive the shaft 3, except that tendency due to the slight friction of the gears and other moving parts. However, if the lever 45 is manipulated to shift the clutch members into engagement with the pins 43, 44, the pins will first engage the elongated slots of the ring 25. This will stop the ring and the drag on the clutch plates 32, 33, will at once have a tendency to stop the two rings 30, 31; whereupon the pins 43, 44 will promptly engage the holes in the ring 31. This will stop and hold the center gear 20 with the result that the disk 17 and connected shaft 3 will be rotated by the movement of the planet gears at a lower speed than the shaft 1.

When the reverse operation takes place, and the lever 45 is manipulated to bring the rings 24 and 30 into engagement with the pins 21, 22, the housing 6 and plate 15 will be locked to the sleeve 21', and the shaft 3 will be driven at the same rate as the shaft 1 and in the same direction. Plates 51, 52 pushed into the holes of the ring 30 serve to prevent the springs 40, 41 from being displaced from the position they should occupy.

What I claim is as follows, but various modifications may be made in the construction shown in the drawings and above particularly described form, within the purview of my invention.

1. In a change speed mechanism, driving and driven members, a clutch element positively engaged with one of said members, a second clutch element frictionally engaged with said first clutch element, and means for positively engaging the second clutch element with the other member.

2. A change speed mechanism including a gearing adapted to drive a shaft at either of two speeds, projecting pins revoluble with the driving shaft, fixed pins, a clutch member including two parts revoluble relatively to each other, means to engage said clutch member with either of said pins, and means to cause one portion of said clutch to come up to speed or to be stopped when the clutch is shifted from one position to the other.

3. A mechanism of the class described comprising a change speed gearing, driving and driven shafts connected therewith, abutments on the driving mechanism, fixed abutments adjacent the driven mechanism, a two part slidable clutch, means to engage said clutch parts successively with either set of abutments, and friction means interposed between the clutch parts to bring the clutch part last engaged up to the speed of the clutch part first engaged prior to the complete engagement of said abutments with both clutch parts.

4. In a change speed mechanism, driving and driven members, a clutch element positively engaged with one of said members, a second clutch element frictionally engaged with said first clutch element, a fixed member, and means for optionally engaging the second clutch element positively with said fixed member or with the other member.

5. In a change speed mechanism, a driving and a driven shaft, a ring gear fixed on one of said shafts, planet gears in mesh with said ring gear and mounted on the other shaft, a center gear journaled concentrically with said other shaft and in mesh with said planet gears, a fixed element, means for optionally positively connecting the center gear with the ring gear or with the fixed element, and means for frictionally connecting the parts prior to said positive connection.

6. A change speed mechanism comprising a driving and a driven shaft, a ring gear fixed on said driving shaft, planet gears in mesh with said ring gear and mounted on said driven shaft, a sleeve journaled on said driven shaft, a center gear fixed on said sleeve and in mesh with said planet gears, a fixed element, a clutch part fixed on said sleeve, a second clutch part frictionally connected to the first clutch part, and means for optionally positively connecting first said second clutch part and then said first clutch part with said fixed element or with said ring gear.

7. A change speed mechanism comprising a driving and a driven shaft, a flange fixed on said driving shaft, a ring gear fixed on said flange, clutch studs mounted on said flange, a disk fixed on said driven shaft, planet gears mounted on said disk and in mesh with said ring gear, a sleeve journaled on said driven shaft, a center gear fixed on said sleeve between said disk and clutch studs and in mesh with said planet gears, fixed clutch studs, a clutch part fixed on said sleeve and having recesses adapting it to positively engage either set of said clutch studs, a second clutch part having recesses adapting it to positively engage either set of said clutch studs, friction plates interposed between said clutch parts, and means for shifting said clutch in either direction.

In testimony whereof I have hereunto set my hand this 10th day of October A. D. 1921.

ERNEST W. JACKSON.